(12) United States Patent
Altmann

(10) Patent No.: US 8,793,723 B2
(45) Date of Patent: Jul. 29, 2014

(54) DETECTION OF ENCRYPTION UTILIZING ERROR DETECTION FOR RECEIVED DATA

(75) Inventor: William Conrad Altmann, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1221 days.

(21) Appl. No.: 12/486,969

(22) Filed: Jun. 18, 2009

(65) Prior Publication Data

US 2010/0322417 A1    Dec. 23, 2010

(51) Int. Cl.
- H04N 7/167 (2011.01)
- H04N 21/4385 (2011.01)
- H04N 21/4405 (2011.01)
- H04N 5/913 (2006.01)
- H04N 1/44 (2006.01)

(52) U.S. Cl.
CPC .......... *H04N 7/167* (2013.01); *H04N 21/4385* (2013.01); *H04N 21/4405* (2013.01); *H04N 5/913* (2013.01); *H04N 1/448* (2013.01)
USPC .............................. 725/31; 380/239; 380/255

(58) Field of Classification Search
CPC ..................................................... H04N 7/167
USPC ......................................................... 725/31
See application file for complete search history.

(56) References Cited

U.S. PATENT DOCUMENTS

| | | | |
|---|---|---|---|
| 6,914,637 B1 * | 7/2005 | Wolf et al. | 348/473 |
| 7,131,004 B1 | 10/2006 | Lyle | |
| 7,242,766 B1 | 7/2007 | Lyle | |
| 2005/0066356 A1 * | 3/2005 | Stone et al. | 725/31 |
| 2007/0274348 A1 * | 11/2007 | Friedman et al. | 370/503 |
| 2008/0180518 A1 * | 7/2008 | Miyazaki | 348/14.01 |
| 2008/0307496 A1 * | 12/2008 | Kurose | 726/2 |
| 2009/0040287 A1 * | 2/2009 | Miyazaki | 348/14.01 |
| 2010/0037253 A1 * | 2/2010 | Sheehan et al. | 725/31 |

FOREIGN PATENT DOCUMENTS

WO    WO-2007094631    8/2007

OTHER PUBLICATIONS

International Search Report and Written Opinion for International Patent Application No. PCT/US2010/037527, Mailed Sep. 3, 2010, 18 pages.

Digital Content Protection LLC, "High-bandwidth Digital Content Protection System", Revision 1.3, Dec. 21, 2006, 90 Pages, XP007914503.

(Continued)

*Primary Examiner* — Nasser Goodarzi
*Assistant Examiner* — Michael B Pierorazio
(74) *Attorney, Agent, or Firm* — Fenwick & West LLP

(57) ABSTRACT

Embodiments of the invention are generally directed detection of encryption utilizing error detection for received data. An embodiment of a method includes selecting a first port for foreground processing of a stream of data received at the first port, the stream of data including content data, and sampling a set of data received at a second port, the second port being not selected for foreground processing, the set of data including a data packet and error correction data. The method further includes performing background processing of the set of data, wherein the background processing includes decrypting data of the data packet and utilizing the error correction data to determine whether the data packet contains an error, and determining whether data received at the second port is encrypted based at least in part on the determination whether the data packet contains an error.

34 Claims, 9 Drawing Sheets

(56) References Cited

OTHER PUBLICATIONS

Hitachi, Ltd., "High-Definition Multimedia Interface Specification Version 1.3a", Internet citation, Nov. 10, 2006, XP002476103, Retrieved from the Internet: URL: http://www.hdmi.org/download/hdmispecification13a.pdf, 276 Pages.

International Preliminary Report on Patentability from PCT/US2010/037527 mailed Jan. 5, 2012, 10 pages.

Digital Content Protection, "HDCP Deciphered White Paper", (Jul. 2008), Whole Document (12 pages).

"Help With Finding Encrypted Files," Aug. 27, 2004, XP055044978, [retrieved on Nov. 20, 2012].

"How to check if a file is encrypted?", Oct. 6, 2004, XP055044976, [retrieved on Nov. 20, 2012].

Examination report dated Nov. 30, 2012, in European Patent Application No. 10726748.6, 13 pages.

European Examination Report, European Application No. 10726748.6, May 15, 2014, 7 pages.

\* cited by examiner

DETECTION OF ENCRYPTION UTILIZING ERROR DETECTION FOR RECEIVED DATA

TECHNICAL FIELD

Embodiments of the invention generally relate to the field of data communications and, more particularly, detection of encryption utilizing error detection for received data.

BACKGROUND

In a system, data may be transmitted in either encrypted or unencrypted form, depending on the conditions, type of data, devices involved, and other factors. In one example, multimedia content, including video data for display, may be received in an encrypted form or unencrypted form depending on the security requirements for the particular data and the types of devices that are involved. Data may include HDMI™ (High-Definition Multimedia Interface) data, where HDMI provides an audio/video interface for transmitting uncompressed digital data. In one example, HDCP™ (High-bandwidth Digital Content Protection) is utilized for digital content protection, providing for encryption of content transmitted over digital interfaces, including HDMI. Content transmitted via an HDMI interface may or may not be encrypted utilizing HDCP, depending on the circumstances.

Encryption technologies, such as HDCP, may not provide a continuous mechanism for detecting an actively-encrypted stream at the receiver end of the link. In a conventional system, an additional process to determine whether a stream of data is encrypted beyond information such as, for example, HDCP notifications sent once per frame, may be required. A system receiving video or audio-video data (which may be referred to as a "sink") from a transmitting system (which may be referred to as a "source") may provide for measurement of data regarding encryption to determine encryption of a data stream. For example, a system receiving video or audio-video data may provide for detection of an OESS (Original Encryption Status Signaling) or EESS (Enhanced Encryption Status Signaling) signal, with such data being provided once prior to transmission of each frame. EESS and OESS are protocols for signaling whether encryption is enabled or disabled for a frame, where EESS protocol is used with the HDMI protocol (and is an optional feature in the DVI™ (Digital Visual Interface) protocol), and where OESS is used with the DVI protocol.

However, the detection of encryption data signaling in a blanking interval generally requires that a system monitor each channel for such signaling regarding encryption. If the signaling is not detected, a conventional system will determine that data is not encrypted. However, if the lack of detection of encryption is due to an error, the system will attempt to utilize data as unencrypted data, thus resulting in errors and delay in processing. A loss of encryption detection or resulting loss of synchronization for encryption may result in to data errors when encryption resumes, even if, for example, encryption is halted temporarily by the source. The loss of synchronization may result in an inaccurate frame index count for an input port, which may result in a failing link integrity check, requiring re-authentication, or leading to an undetected link integrity problem thereby, causing ongoing errors in decryption and a poor quality picture on the display.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
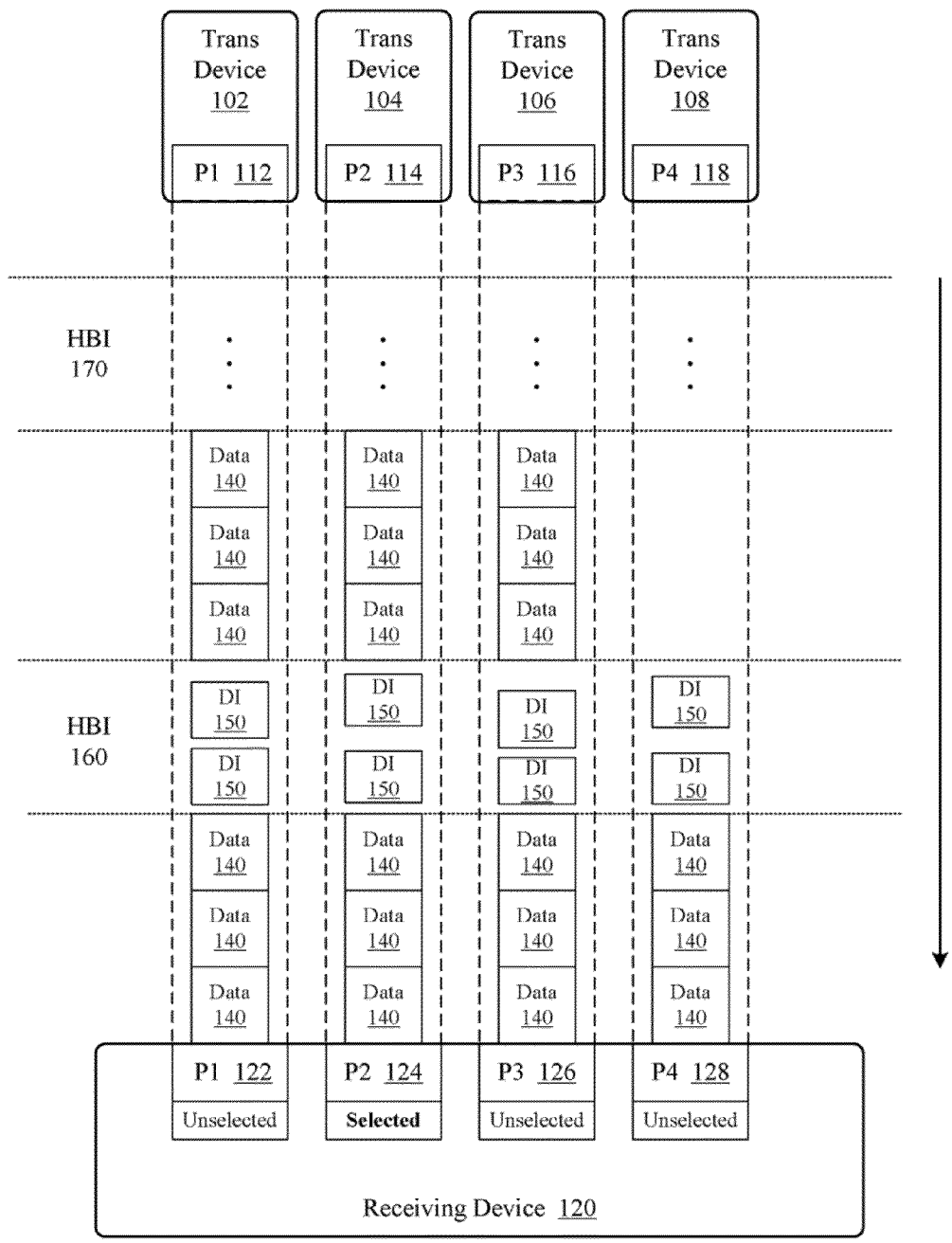
FIG. 1 is an illustration of a system for detection of encryption in a stream of data.

Embodiments of the invention are generally directed to detection of encryption utilizing error detection for received data.

In a first aspect of the invention, an embodiment of a method includes selecting a first port for foreground processing of a stream of data received at the first port, the stream of data including content data, and sampling a set of data received at a second port, the second port being not selected for foreground processing, the set of data including a data packet and error correction data. The method further includes performing background processing of the set of data, wherein the background processing includes decrypting data of the data packet and utilizing the error correction data to determine whether the data packet contains an error, and determining whether data received at the second port is encrypted based at least in part on the determination whether the data packet contains an error.

In a second aspect of the invention, an embodiment of a receiving device includes ports for the reception of data; a first processing engine for foreground processing of a data stream, a first port being selected for foreground processing; a sampling engine to sample data and a locking circuit to lock a clock signal for data sampling; and a second processing engine for background processing of data for each port that has not been selected for foreground processing. The sampling engine samples a set of data from a second port of the plurality for ports that has not been selected for foreground processing, and the second processing engine decrypts the sampled data and determines whether the set of data is encrypted based at least in part on a determination whether an error is found in the sampled data.

DETAILED DESCRIPTION

Embodiments of the invention are generally directed to detection of encryption utilizing error detection for received data.

In some embodiments, a system provides for detection of encrypted data through use of error detection processing of received data signals. In some embodiments, a system provides for analysis of data for presence of errors without requiring detection of encryption of status signaling provided by an encryption protocol. An encryption protocol may include HDCP and data signals may include HDMI signals, but embodiments are not limited to such technologies.

In some embodiments, a system provides for error detection on multiple ports through use of error detection on each of the ports. In some embodiments, a system may sample multiple ports during an interval to detect errors, and determine which of the ports is receiving encrypted data.

In operation, an audio-video signal such as HDMI may provide certain data in blanking intervals between video data frames, with such data including, for example, audio and control data. Such blanking intervals may include the transmission of signals related to encryption, such as EESS and OESS signals. In operation, knowledge regarding encryption of received signals may be required to maintain data regarding received data frames, such as to allow that a link integrity check ('Ri') frame index be kept accurate. However, an attempt to detect such signals in a blanking interval may require significant overhead to provide detection, and may result in errors in determining encryption. An alternative process for using a port engine to sample a vertical blanking interval at each input port that has not been selected for data processing, in which a system looks for an EESS signal itself or operates to store the stream data for post-processing, would require multiple engines and locking circuits, PLL (Phase Lock Loop) or DLL (Delay Lock Loop), because the EESS signals from multiple ports may coincide in time.

In some embodiments, horizontal blanking may be sampled at any line break in a frame, provided that there is sampling once per frame at each input port. In some embodiments, a single logic engine, such as a single HDCP logic engine, in a chip in a system may be utilized to manage multiple input ports, such as multiple HDMI input ports, with the system providing a mechanism for detecting which frames on each input port are encrypted. In operation of a system including multiple ports, at a point in time one port may be selected for processing of content data (referred to herein as foreground or primary processing) while the other ports are not selected for such use. In some embodiments, the single logic engine may be used to monitor multiple ports if the logic engine is not required to detect an OESS or EESS signal that is provided prior to each frame. For example, if two OESS or EESS signals coincide in time on two or more ports, then a single, simple engine would be unable to sample each port simultaneously, and thus will miss one or more OESS/EESS signals. As a result of the error, the receiver may then have an inaccurate frame index count for an input port, thus leading to a failing link integrity check, requiring re-authentication, or leading to an undetected link integrity problem, causing ongoing errors in decryption and a poor quality picture on the display.

In operation, HDMI transmitters send "data islands" of various types in each horizontal blanking interval, in order to carry audio data or other auxiliary data. In some embodiments, encryption may be detected through processing of the data islands (referred to herein as background or secondary processing). When HDCP is enabled, such data packets have payload data that is encrypted by the transmitter and decrypted by a receiver. In an implementation, the boundaries of each packet may be detected by the receiver through the use of guard-band characters. In some embodiments, if the packets are decrypted by the receiver using the current secret values from the preceding frames and authentication on that link (which may be referred to as a trial decryption of the data packet), and the packet data is then found to contain errors, then the receiver chip can conclude that the data island payload was not encrypted by the transmitter. In such circumstance, it may be concluded that the frame including such packets was not encrypted, with such detection of encryption being made through the background processing of data without requiring detection of OESS or EESS signaling from the transmitter for that frame.

In some embodiments, a receiver chip may include a sampling logic block and a locking circuit, PLL (Phase Lock Loop) or DLL (Delay Lock Loop). In some embodiments there may be a sampling logic block and a locking circuit for each input port. In some embodiments, a PLL for each port can lock to the link clock at each successive port, and, once locked, will sample the horizontal blanking interval looking for data islands and data payloads to decrypt and check. In some embodiments, counters and logic are used in the receiver together with a clock that is unrelated to the link clock at any port, to schedule the switching among ports and sampling windows.

In some embodiment a sampling logic block and locking circuit may be utilized for multiple input ports, including, for example, a system in which a single sampling logic block and locking circuit is used for all input ports of a receiver. In some embodiments, the receiver chip will monitor for the presence of a data island using unique out-of-band guard-band characters for data islands. In some embodiments, data may be stored for later processing. In a protocol, such as HDMI, each data island has a maximum size (in pixel clocks) and may be temporarily stored for decoding and decryption.

In some embodiments, a single HDCP processing engine, through the swapping in and out of secret values unique to each input port, may decrypt the captured data islands. In such embodiments, the HDCP processing engine thus need not be replicated and provided for each input port. However, the number of processing engines may vary in different embodiments. In some embodiments, a background processing engine is also provided in the receiver, with the background processing engine being used to establish authentication at each port that is not selected for foreground processing on the receiver, can be used to sample the data island data on all ports by scheduling the sampling in non-overlapping intervals.

To provide effective operation, data sampling may be required to capture sufficient data values from each port so that, in post-processing, there is a low likelihood that a link error that is unrelated to encryption will be mistakenly seen by the receiver as an indication of an unencrypted stream. In an example, if the bit error rate on a link itself is high enough to result in errors at the receiver regarding whether or not the receiver decrypts the incoming stream, a receiver may be required to provide a more extensive evaluation to distinguish errors that are caused by the link from errors that are caused by trial decryption of an unencrypted stream. The former should not inform the receiver that the incoming stream is unencrypted, while the latter should inform the receiver that the incoming stream is unencrypted. In some embodiments, if the guaranteed link error rate is not low enough, then the receiver may sample data islands from more than one horizontal blanking interval, and weigh the error detection by trial decryption across more than one series of data island data. An approach of sampling more than one horizontal blanking time may operate to increase the robustness of the encryption detection by separating the checking process into more than one time interval. In operation, link errors that cluster in short bursts because of link behavior may therefore be less likely to cause a false negative in the check for encryption.

In some embodiments, the values required by a link's encryption method (for example, HDCP), may be generated by the receiver's logic separately from the timing of the incoming stream, and then may be applied to the incoming stream at each port at the proper clock cycle. In some embodiments, values for multiple ports may be generated and stored for use in background processing as sampled data for each port becomes available. For example, HDCP encryption consists of a bit-wise XOR (Exclusive OR) of HDCP content with a pseudo-random data stream produced by an HDCP cipher. During the vertical blanking interval, the hdcpBlockCipher function prepares the HDCP to produce the 24-bit wide key-dependent pseudo random data stream during the data period. During horizontal blanking intervals on an interface, the HDCP cipher is re-keyed for 56 pixel clocks, and during horizontal blanking intervals that immediately follow active lines of pixel data, hdcpRekeyCipher moves new key material from the LFSR module into the Block module. For example, the receiver may calculate a series of XOR masks for what will be its intended captured series of data islands, store those masks in a temporary memory, and then use the masks when the respective series of data islands is captured. Because each input port has a unique sequence of XOR masks, as a result of the initial authentication with each upstream source, the XOR masks for one input stream may not be used for a different input stream. In some embodiments, the calculation and storage of masks and related interim values may be optimized by the receiver to minimize the logic and memory requirement in the receiver.

In some embodiments, a method for detection of encryption through error detection will operate in various protocols, including HDMI and MHL modes, because of the presence of data islands containing ECC (Error Correction Code) bytes in such protocols. The encryption detection may relate to EESS mode detection because this detection is required in HDMI and MHL mode. However, embodiments of the invention are not limited to HDMI and MHL, and may be utilized in various protocols that provide for error correction coding. For example, in some embodiments, the encryption detection technique may be applied to link protocols that use ECC and data islands, and allow for OESS signaling.

In some embodiments, a further enhancement may include insertion of error-checking bits into video data periods in which there are unused bits, which may be referred to herein with regard to video data as a pixel data ECC method. In an example, the data insertion in a pixel data ECC method may be provided in HDMI mode when the link is operating in YCbCr 4:2:2 mode, with fewer than 12 bits per color. In operation, luma and chroma values for such mode are normally transmitted as two 8-bit values within a 24-bit field in the protocol, and thus the remaining eight bits of the field are unused. HDMI's 4:2:2 packing protocol places these eight unused bits in the Channel 0 field, which is the same field as is used for header and ECC data during data island periods. In some embodiments, by putting ECC bits into these unused bits, the link may, based on the pixel value in the utilized 16 bits, carry ECC for the video data. In some embodiments, the inserted video ECC may be decrypted by an HDCP engine in the same manner as is described above for data islands in order to determine whether the link is or is not encrypted.

An advantage that is provided by the pixel data ECC method is that such process will work even when there are no data islands, such as when no AVI InfoFrame is required, and no audio is being transmitted. In some embodiments, the process also allows a sampling engine to collect channel data at any time (a) between data island leading and trailing guard band characters, or (b) after video period leading guard band characters and before the trailing edge of DE.

FIG. 1 is an illustration of a system for detection of encryption in a stream of data. In some embodiments, multiple transmitting devices 102-108, each having a port, illustrated respectively as port P1 112, port P2 114, port P3 116, and port P4 118, transmit data to a receiving device 120 having multiple ports, illustrated as port P1 122, port P2 124, port P3 126, and port P4 128. While not illustrated, a transmitting device may have multiple ports. As illustrated a stream of data elements 140 may be received at each of the ports. In operation, the receiving device will select a port for foreground processing of a data stream, which in this illustration is port P2 124. In some embodiments, the data may include audio-video data such as HDMI, wherein a stream of video data may be received at each of the plurality of ports.

In some embodiments, the streams of data may be halted for a horizontal blanking interval (HBI) 160, during which the transmitting device 102 may transmit data islands (DI) or other sets of data 150 including, for example, HDMI audio and control data. In some embodiments, the receiving device provides background processing of the data islands 150, operating to sample and process data islands 150 from the ports that are not selected for foreground data stream processing, which in this illustration are port P1 122, port P3 126, and port P4 128. In some embodiments, the receiving device will analyze the sampled data to determine whether errors are present in the data, where the processing assumes that the data is encrypted and the presence of the errors when the data is processed indicates that the data is not encrypted.

In some embodiments, one or more data islands 150 may be generated for the purpose of encryption detection without such data islands being required for the transmission of other data. For example, in an audio-visual data system, data islands may be generated containing ECC with non-content data (such as Null Packets), even though such data islands do not carry content pertinent to video or audio streams.

Figure 2:
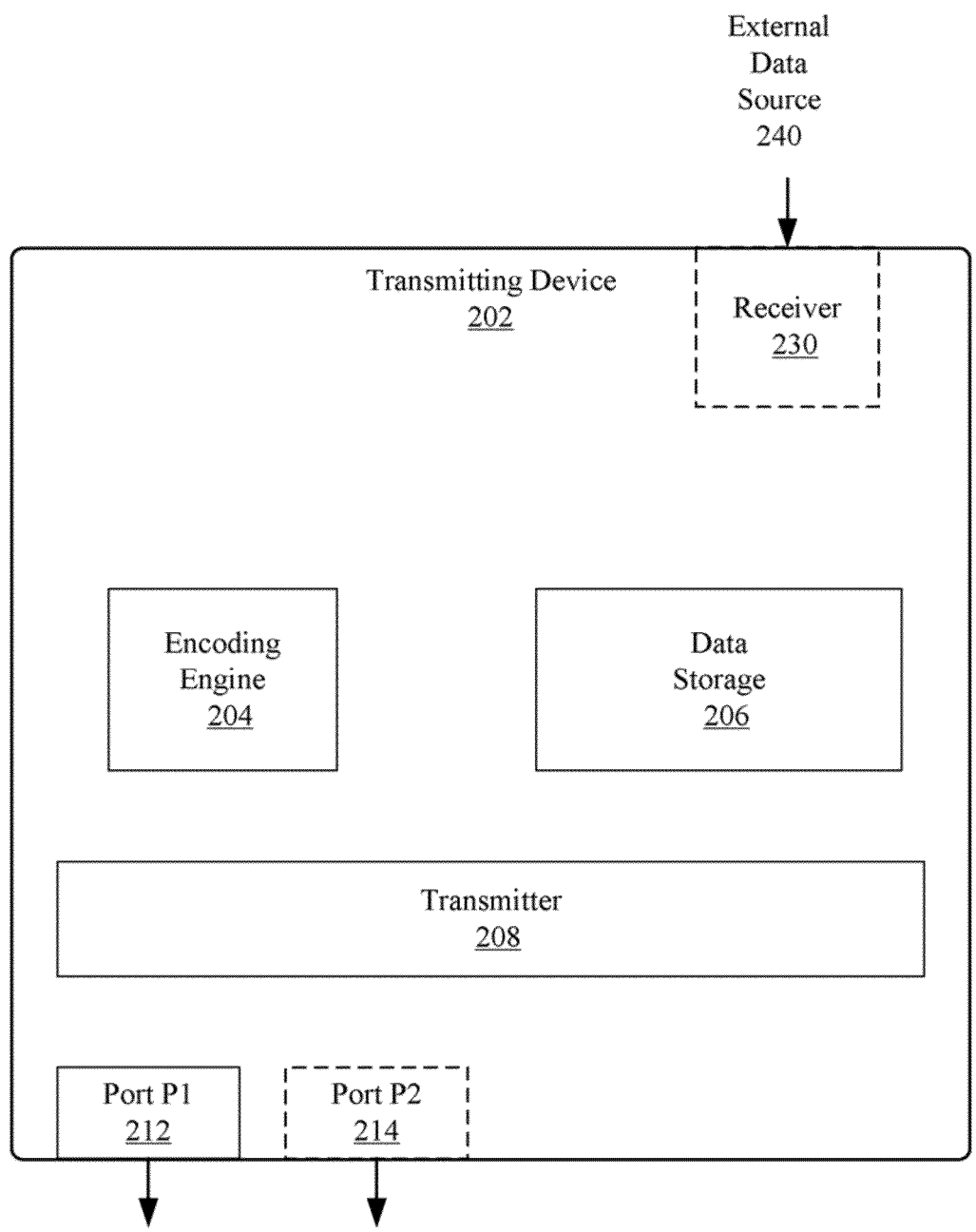
FIG. 2 is an illustration of an embodiment of a transmitting device.

FIG. 2 is an illustration of an embodiment of a transmitting device. The transmitting device may include a source for transmission of audio-video data. The transmitting device 202 includes an encoding engine 204, which may be used to encrypt data. Encryption may include HDCP encryption of HDMI data. However, data may or may not be encrypted depending on the circumstances. The data may include streams of data, such as video data, together with data islands or other sets of data sent during intervals (horizontal blanking intervals) between transmissions of video data.

The transmitting device may not provide a continuous notice mechanism regarding the encryption of data, such as an HDCP system providing notice at an end of a frame. In some embodiments, a receiving device determines the state of encryption through background processing of a sample of data contained in data islands for data ports that are not selected for foreground processing. The transmitting device 202 may further include a data storage 206 for data processing, a transmitter 208 for transmission of data, and one or more ports for data transmission, illustrated here as port P1 212, with potential inclusion of one or more additional ports, such as port P2 214. The transmitting device may further include a receiver 230 for the reception of content data from an external data source 240. Details regarding such receiver are not presented in this figure.

Figure 3:
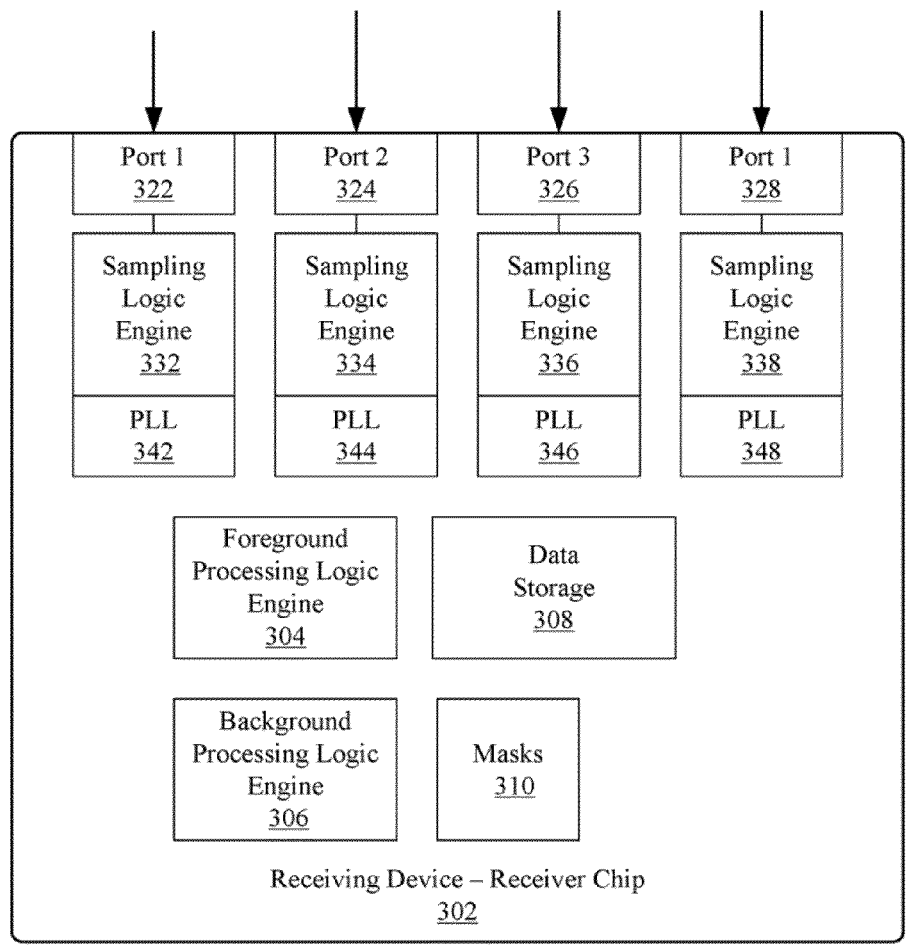
FIG. 3 is an illustration of an embodiment of a receiving device.

FIG. 3 is an illustration of an embodiment of a receiving device. The receiving device may be, for example, a sink for reception of audio-video data. The receiving device 302 may include a single chip device for an apparatus or system receiving content data at multiple ports, such as a device receiving multiple HDMI data sources. In some embodiments, the receiving device 302 may include a foreground or primary processing logic engine 304 for processing of a data stream at a data port that is selected for foreground processing and a background or secondary processing logic engine 306 for the processing of sampled data at data ports that are not selected for foreground processing. In some embodiments, the receiving device 302 utilizes the processed data from the background processing logic engine to determine whether data at ports that are not selected for foreground processing is encrypted based at least in part upon whether errors are found in the such data in the processing of such data. The receiving device may further include data storage 308 for processing of data, and storage for masks and other information for the processing of the data at the data ports that are not selected for foreground processing.

The receiving device 302 may further include multiple ports, illustrated here as port P1 322, port P2 324, port P3 326, and port P4 328. In some embodiments, each port may have an associated sampling logic engine 332-338 for the sampling of sets of data received at the ports that are not selected for foreground processing. In some embodiments, each port may have an associated locking circuit, illustrated as phase lock loop (PLL) 342-348, to lock to the link clock at each port, and, once locked, to sample data islands during the horizontal blanking interval to decrypt and check.

Figure 4:
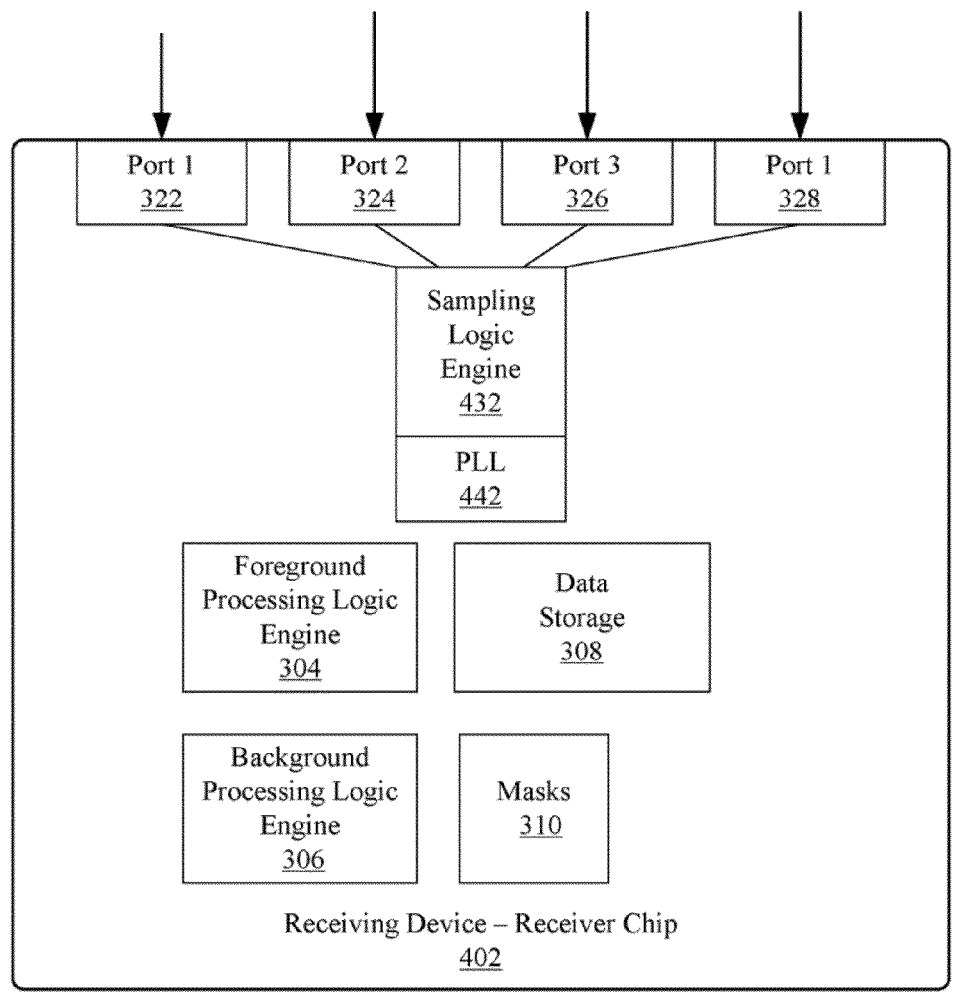
FIG. 4 is an illustration of an embodiment of a receiving device with a single sampling circuit and locking circuit for multiple ports.

FIG. 4 is an illustration of an embodiment of a receiving device with a single sampling circuit and locking circuit for multiple ports. As described in relation to FIG. 3, receiving device 402 may include a foreground processing logic engine 304 for processing of a data stream at a data port that is selected for foreground processing, a background processing logic engine 306 for the processing of sampled data at data ports that are not selected for foreground processing, and data storage 308 for processing of data, and storage for masks and other information for the processing of the data at data ports that are not selected for foreground processing. The receiving device 402 may further include multiple ports, illustrated here as port P1 322, port P2 324, port P3 326, and port P4 328. In some embodiments, the receiving device 302 may include a sampling logic engine 432 for the sampling of sets of data received at each port and a locking circuit, illustrated as phase lock loop (PLL) 442, to lock to the link clock at each port. In some embodiments, the sampling logic engine 432, once locked with the PLL 442, will sample data islands during the horizontal blanking interval at ports that were not selected for foreground processing to decrypt and check the data for errors. In the illustrated system, the receiving device 402 includes a single sampling logic engine 432 and a single phase lock loop 442 to poll each of the ports of the receiving device 302 that were not selected for foreground processing. However, in other embodiments it is possible that multiple logic engines and locking circuits may be implemented, with each being used to poll less than all of the ports that were not selected for foreground processing.

Figure 5:
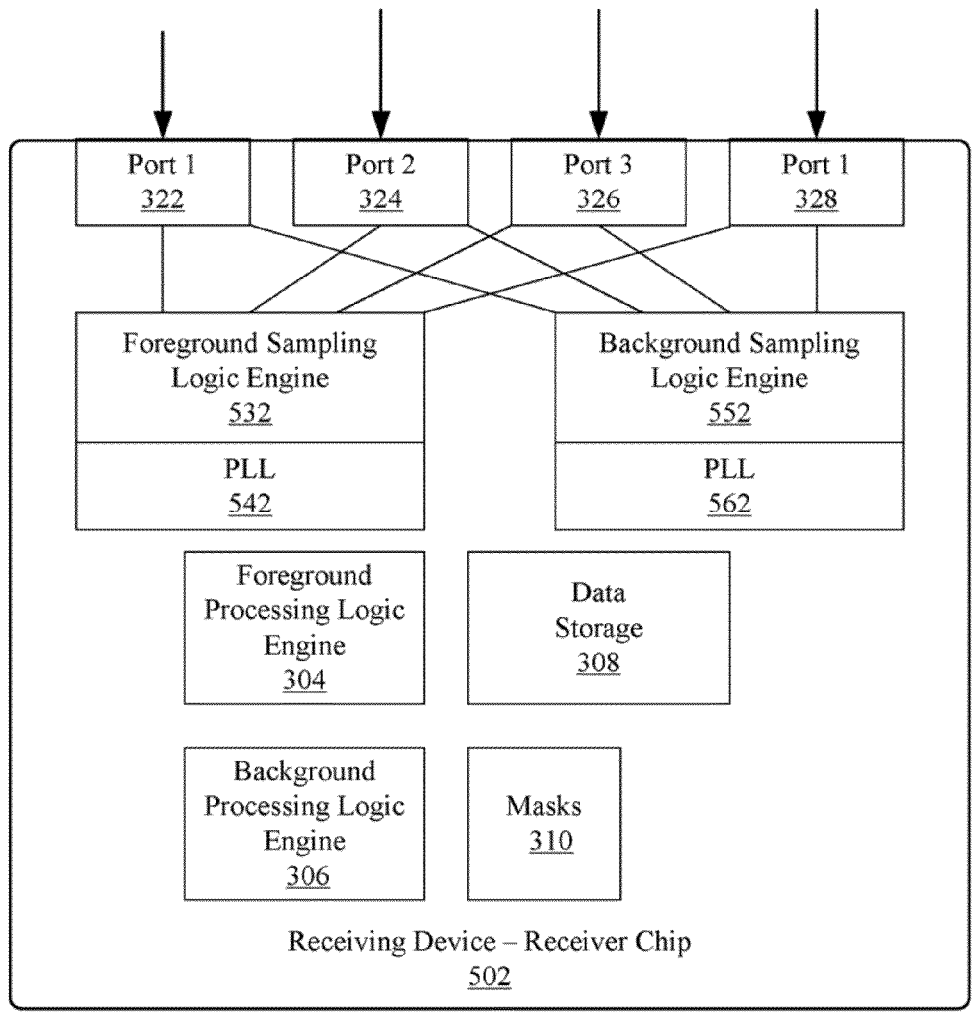
FIG. 5 is an illustration of an embodiment of a receiving device with a foreground sampling circuit and locking circuit and a background sampling circuit and locking circuit.

FIG. 5 is an illustration of an embodiment of a receiving device with a foreground sampling circuit and locking circuit and a background sampling circuit and locking circuit. As described in relation to FIG. 3, receiving device 502 may include a foreground processing logic engine 304 for processing of a data stream at a selected data port, a background processing logic engine 306 for the processing of sampled data at data ports that are not selected for foreground processing, and data storage 308 for processing of data, and storage for masks and other information for the processing of the data at data ports that are not selected for foreground processing. The receiving device 302 may further include multiple ports, illustrated here as port P1 322, port P2 324, port P3 326, and port P4 328. In some embodiments, the receiving device 302 may include a foreground sampling logic engine 532 for the sampling of data received at a port that that has been selected for foreground processing and a locking circuit, illustrated as phase lock loop (PLL) 542, to lock to the link clock at the selected port. In some embodiments, the receiving device 502 will further include a background sampling logic engine 552 for the sampling of sets of data received at the ports that were not selected for foreground processing and a locking circuit, illustrated as PLL 562, to lock to the link clock at each such port, and, once locked, to sample data islands during the horizontal blanking interval to decrypt and check data. In some embodiments the PLL 562 may poll each of the ports that are not selected for foreground processing to sample the data during a blanking period.

Figure 6:
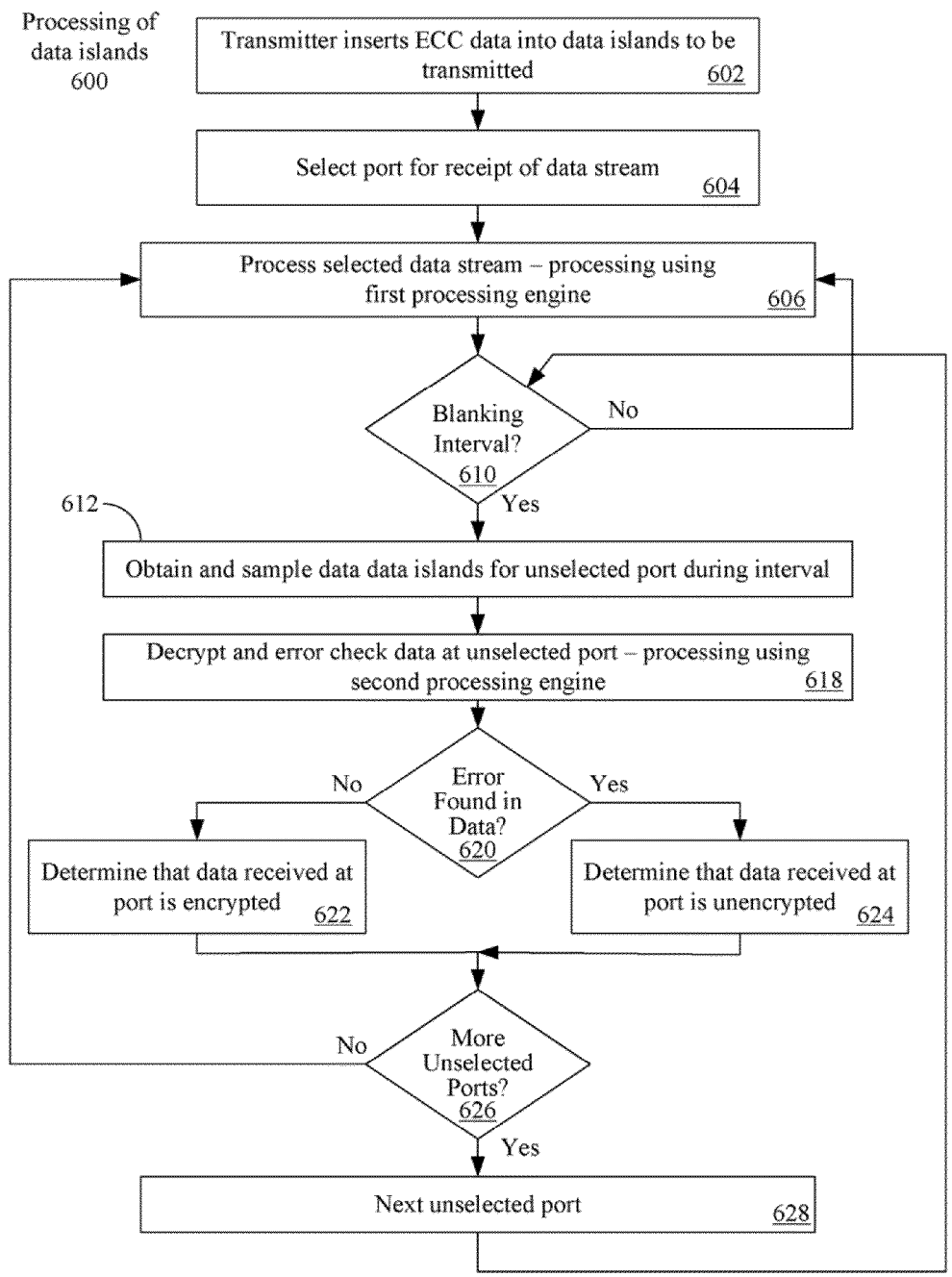
FIG. 6 is a flowchart to illustrate a process for detecting encryption in a stream of data including processing of data islands.

FIG. 6 is a flowchart to illustrate a process for detecting encryption in a stream of data including processing of data islands. Data received and processed may include, for example, data islands containing ECC data that are received in a blanking interval 600. The transmitter may insert ECC data into the data islands to be transmitted during blanking intervals 602. In some embodiments, a receiving device may include multiple ports and the system may select one of the ports of the receiving device to receive a stream of data for foreground processing 604, while the rest of the ports are not selected for such processing. In some embodiments, the method provides for background processing including sampling of the data received at ports that are not selected for foreground processing to determine whether the data is encrypted based upon error detection for the received data.

The system operates to process the selected data 606, such as processing HDMI data received at the selected port. In some embodiments, the processing is conducted by a first processing engine, such, for example, a foreground processing logic engine 304 illustrated in FIGS. 3-5. In some embodiments, data subject to background processing are data islands received at ports that are not selected for foreground processing 608. In the transmission of data such as video data for HDMI a horizontal blanking interval, or other interval in which the data stream is halted, may occur, and, upon such an interval occurring 610, the system will obtain and sample data from one or more ports that have not been selected for foreground processing 612. In some embodiments, the system will provide background processing of the sampled data, including decrypting and error checking the data 618. The background processing may be provided by a second processing engine, such as, for example, the background processing logic engine 306 illustrated in FIGS. 3-5. If the error check indicates that the data does not contain an error 620, then the system may conclude that the received data is encrypted 622. However, if the error check indicates that the received data contains an error, the system may conclude that the received data is unencrypted 624 (the lack of encryption having caused the error), and thus that encryption has been turned off at the transmitter.

The system may then continue to examine other ports that have not been selected for foreground processing by, for example, making a determination whether other ports remain to be analyzed 626 and, if so, performing background processing of data for the next port that was not been selected for foreground processing 628. If there is an additional port for background processing and the blanking interval has not ended 610, the error processing of such data may continue with obtaining and sampling of data from the port 612. In other embodiments, multiple blanking intervals may be used to determine whether the ports that are not selected for foreground processing are receiving encrypted data.

Figure 7:
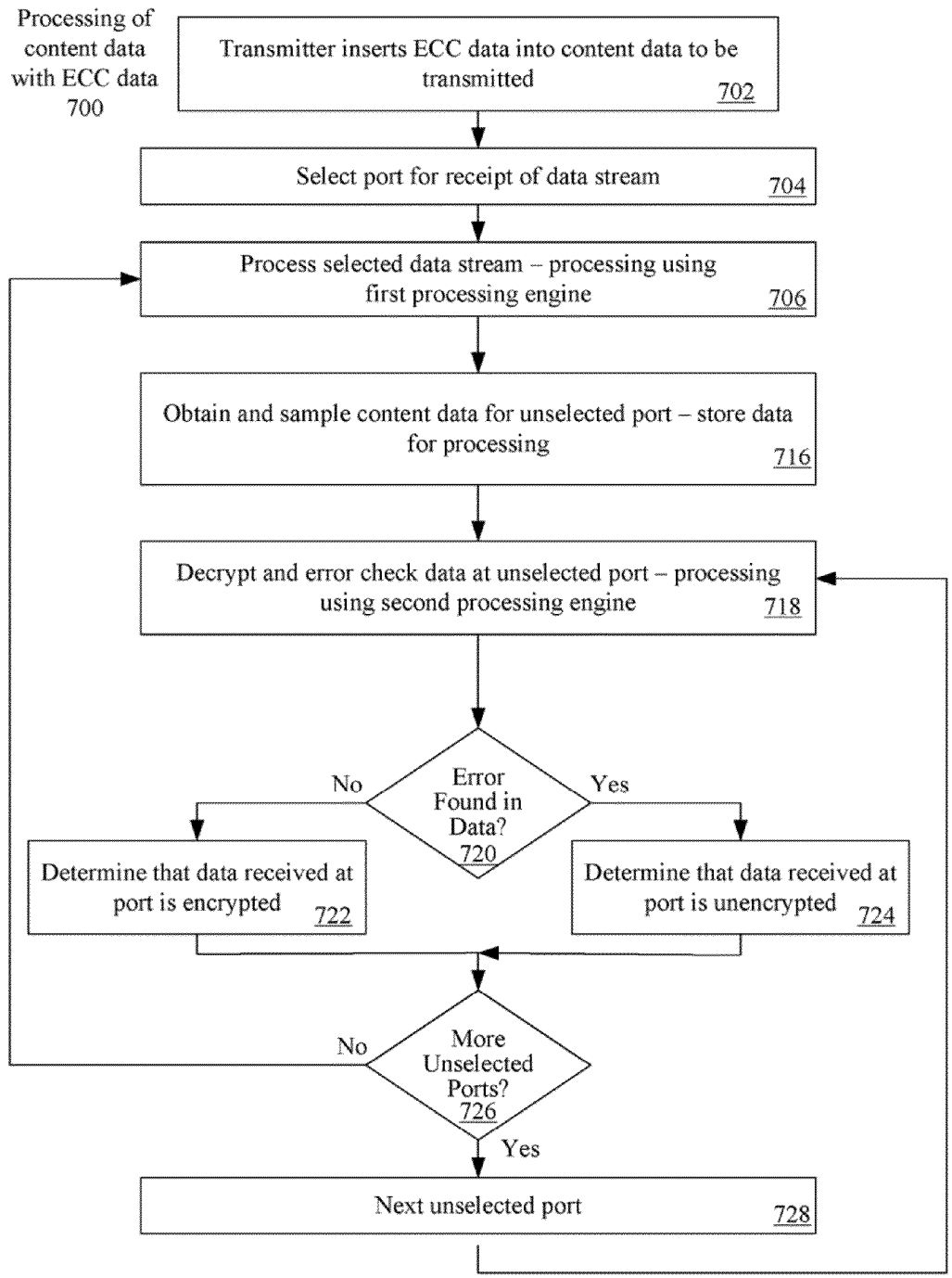
FIG. 7 is a flowchart to illustrate a process for detecting encryption in a stream of data including processing of content data.

FIG. 7 is a flowchart to illustrate a process for detecting encryption in a stream of data including processing of content data. Content data received and processed may include, for example, video data that includes ECC data 700. In some embodiments, a transmitter may insert ECC data into such content data 702, such as the insertion of ECC data in the pixel data ECC method described above. In some embodiments, a receiving device may include multiple ports and the system may select one of the ports of the receiving device to receive a stream of data for foreground processing 704, while the rest of the ports are not selected for such processing. In some embodiments, the method provides for background processing including sampling of the data received at ports that are not selected for foreground processing to determine whether the data is encrypted based upon error detection for the received data.

The system operates to process the selected data 706, such as processing HDMI data received at the selected port. In some embodiments, the processing is conducted by a first processing engine, such, for example, a foreground processing logic engine 304 illustrated in FIGS. 3-5. In some embodiments, data subject to background processing includes the processing of content data received at ports that are not selected for foreground processing, which may be stored for later background processing 716. In some embodiments, the system will provide background processing of the sampled data, including decrypting and error checking the data 718, which may be provided by a second processing engine, such as, for example, the background processing logic engine 306 illustrated in FIGS. 3-5. If the error check indicates that the data does not contain an error 720, then the system may conclude that the received data is encrypted 722. However, if the error check indicates that the received data contains an error, the system may conclude that the received data is unencrypted 724 (the lack of encryption having caused the error), and thus that encryption has been turned off at the transmitter.

The system may then continue to examine other ports that have not been selected for foreground processing by, for example, making a determination whether other ports remain to be analyzed 726 and, if so, continuing with the next port that was not been selected for foreground processing 728, including the decryption and error checking of content data that was received at the port 718.

Figure 8:
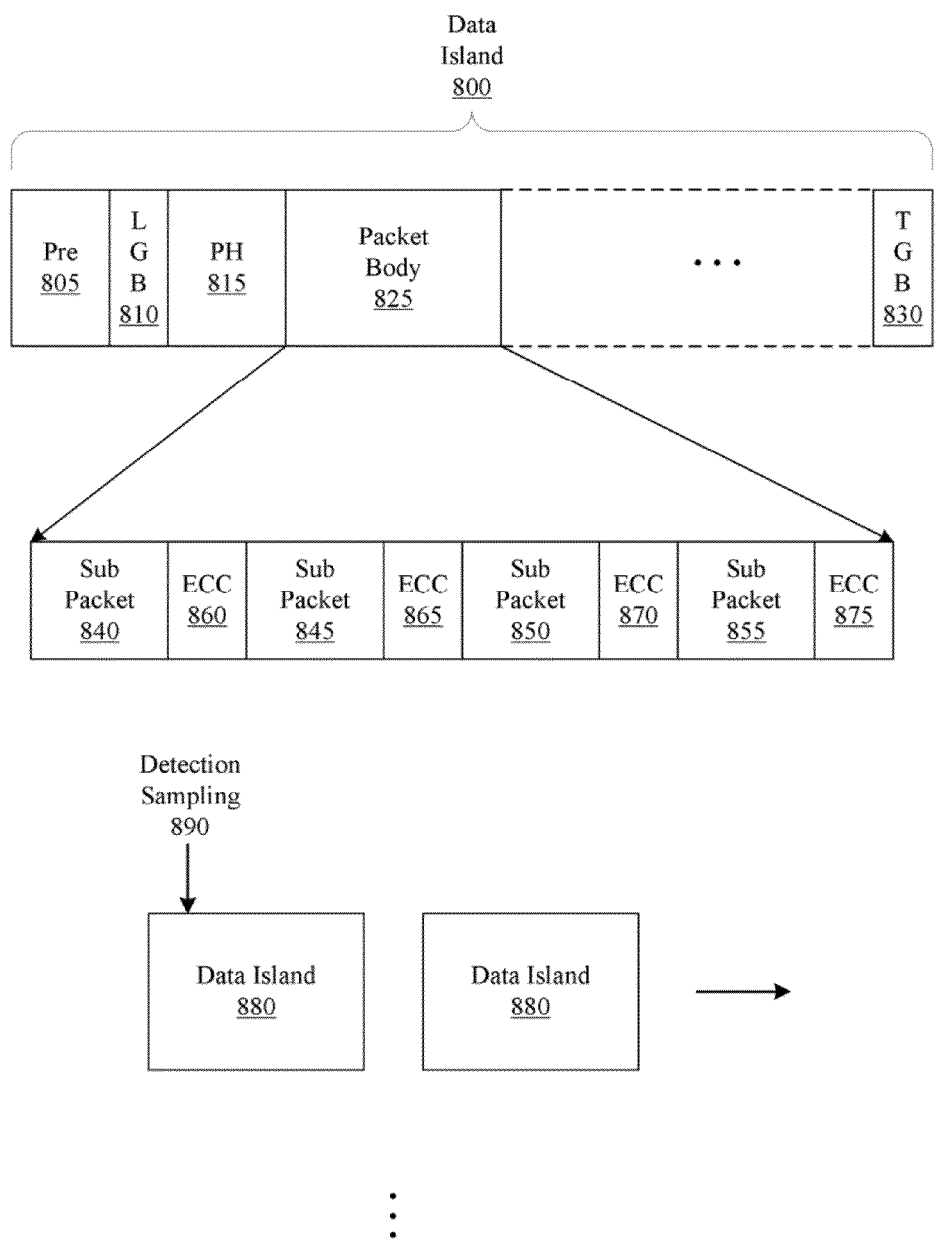
FIG. 8 is an illustration of data that is evaluated for encryption in some embodiments.

FIG. 8 is an illustration of data that is evaluated for encryption in some embodiments. In this illustration, a data island 800 or other set of data may include, for example, an HDMI data island. The data island 800 include a preamble 805 followed by a leading guard band (LGB) 810. In some embodiments, a data island may be detected using the preamble 805 or leading guard band 810. Following the leading guard band 810 may include one or more data packets, including a packet header 815 and a packet body 825. The data packets may be followed by a trailing guard band (TGB) 830.

In this example, each packet body may include multiple sub-packets 840-855 and ECC data sectors 860-875. In some embodiments, the encryption of the sub-packets may be determined through use of the ECC data to determine whether data errors are present. For example, a process of detection and sampling 890 may result in decryption and error checking of data in a data island 880 or checking of other data to determine whether the data in the data island is encrypted.

Figure 9:
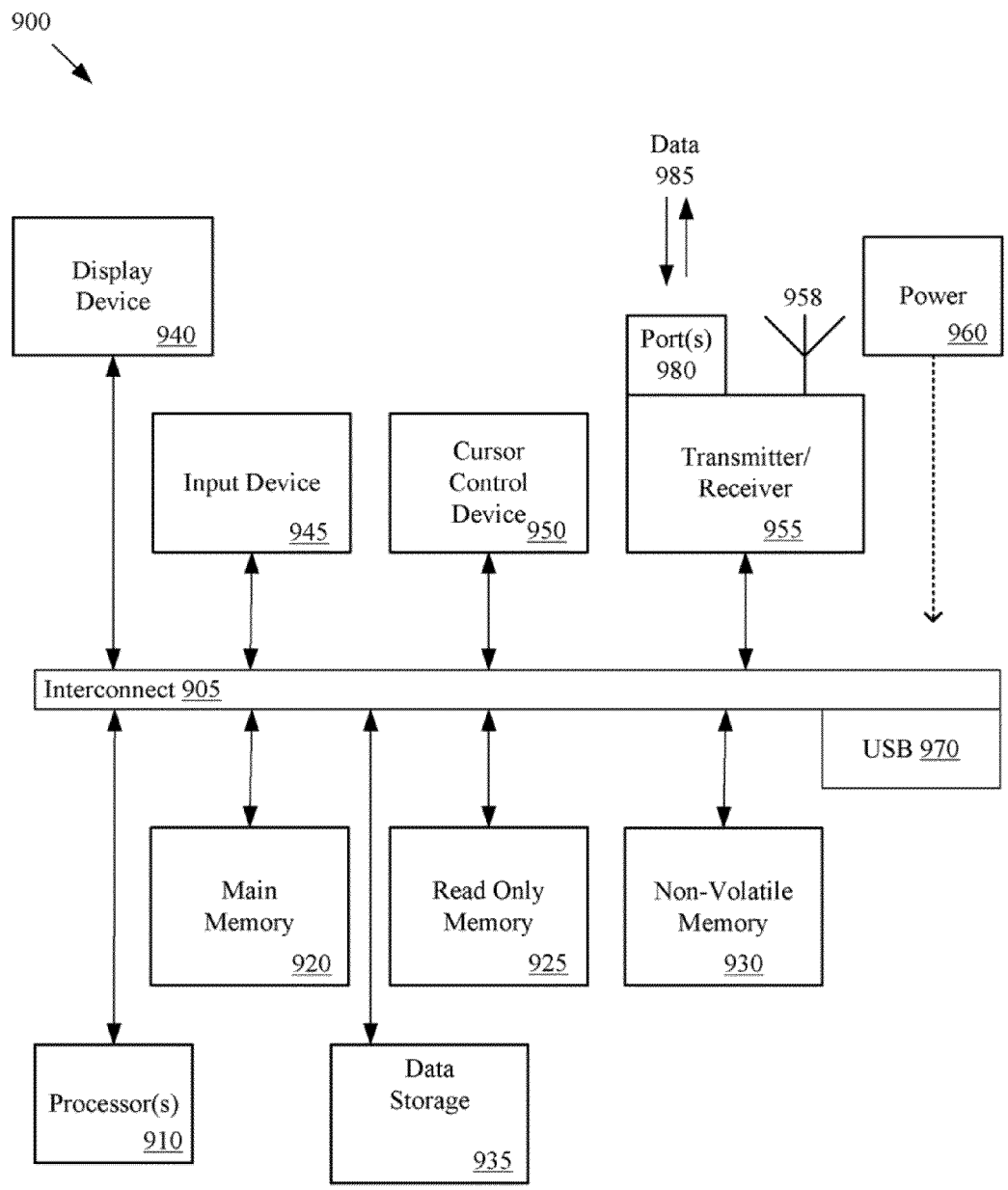
FIG. 9 is an illustration of elements of an embodiment of a receiving or transmitting device.

FIG. 9 is an illustration of elements of an embodiment of a receiving or transmitting device. In this illustration, certain standard and well known components that are not germane to the present description are not shown. Under some embodiments, a device 900 may be a transmitting device, a receiving device, or both.

Under some embodiments, the device 900 comprises an interconnect or crossbar 905 or other communication means for transmission of data. The data may include audio-visual data and related control data. The device 900 may include a processing means such as one or more processors 910 coupled with the interconnect 905 for processing information. The processors 910 may comprise one or more physical processors and one or more logical processors. Further, each of the processors 910 may include multiple processor cores. The interconnect 905 is illustrated as a single interconnect for simplicity, but may represent multiple different interconnects or buses and the component connections to such interconnects may vary. The interconnect 905 shown in FIG. 9 is an abstraction that represents any one or more separate physical buses, point-to-point connections, or both connected by appropriate bridges, adapters, or controllers. The interconnect 905 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 900 further may include a serial bus, such as USB bus 970, to which may be attached one or more USB compatible connections.

In some embodiments, the device 900 further comprises a random access memory (RAM) or other dynamic storage device as a main memory 920 for storing information and instructions to be executed by the processors 910. Main memory 920 also may be used for storing temporary variables or other intermediate information during execution of instructions by the processors 910. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 900 also may comprise a read only memory (ROM) 925 or other static storage device for storing static information and instructions for the processors 910. The device 900 may include one or more non-volatile memory elements 930 for the storage of certain elements.

Data storage 935 may also be coupled to the interconnect 905 of the device 900 for storing information and instructions. The data storage 935 may include a magnetic disk, an optical disc and its corresponding drive, or other memory device. Such elements may be combined together or may be separate components, and utilize parts of other elements of the device 900.

The device 900 may also be coupled via the interconnect 905 to a display or presentation device 940. In some embodiments, the display may include a liquid crystal display (LCD), a plasma display, a cathode ray tube (CRT) display, or any other display technology, for displaying information or content to an end user. In some embodiments, the display 940 may be utilized to display television programming. In some environments, the display 940 may include a touch-screen that is also utilized as at least a part of an input device. In some environments, the display 940 may be or may include an audio device, such as a speaker for providing audio information, including the audio portion of a television program. An input device 945 may be coupled to the interconnect 905 for communicating information and/or command selections to the processors 910. In various implementations, the input device 945 may be a keyboard, a keypad, a touch screen and stylus, a voice activated system, or other input device, or combinations of such devices. Another type of user input device that may be included is a cursor control device 950, such as a mouse, a trackball, or cursor direction keys for communicating direction information and command selections to the one or more processors 910 and for controlling cursor movement on the display 940.

One or more transmitters or receivers 955 may also be coupled to the interconnect 905. In some embodiments the device 900 may include one or more ports 980 for the reception or transmission of data. Data that may be received or transmitted may include video data or audio-video data, such as HDMI data, and may be encrypted, such as HDCP encrypted data. In some embodiments, the device 900 is a receiving device, and operates to select a port for the reception of data, while sampling data from one or more other ports to determine whether the data received at the ports that have not been selected for foreground processing is encrypted. The device 900 may further include one or more antennas 958 for the reception of data via radio signals. The device 900 may also comprise a power device or system 960, which may comprise a power supply, a battery, a solar cell, a fuel cell, or other system or device for providing or generating power. The power provided by the power device or system 960 may be distributed as required to elements of the device 900.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
selecting a first port of a plurality of ports for foreground processing of a stream of data received at the first port, the stream of data including content data;
sampling a set of data received at a second port of the plurality of ports, the second port being not selected for foreground processing, the set of data including a data packet and error correction data;
performing background processing of the set of data received at the second port to determine whether of the set of data is encrypted, the background processing comprising decrypting the data packet and determining whether the decrypted data packet contains an error by analyzing the error correction data;
determining the set of data to be encrypted responsive to determining that the data packet does not contain the error; and
determining the set of data as not being encrypted responsive to determining that the data packet contains the error.

2. The method of claim 1, wherein the set of data received at the second port is sampled during a blanking interval for data received at the plurality of ports.

3. The method of claim 2, wherein the set of data comprises one or more data islands received during the blanking interval.

4. The method of claim 2, further comprising sampling and decrypting data from each other port of the plurality of ports that has not been selected for foreground processing to determine encryption of the data received at each other port.

5. The method of claim 4, wherein sampling and decrypting data comprises sampling and decrypting data from each of the ports that have not been selected for foreground processing during the blanking interval.

6. The method of claim 2, further comprising sampling data at the second port in a plurality of blanking intervals, the plurality of blanking intervals including the blanking interval and a second blanking interval.

7. The method of claim 6, wherein performing background processing further includes background processing of data from a second set of data sampled in the second blanking interval, the second set of data including a second data packet, wherein determining whether data received at the second port is encrypted is further based on a determination whether the second data packet contains an error.

8. The method of claim 2, wherein the stream of data comprises video data, and wherein the set of data received at the second port comprises audio data, control data, or both audio data and control data transmitted during the blanking interval.

9. The method of claim 1, wherein the second set of data comprises additional content data that includes error correction data.

10. The method of claim 9, wherein the second set of data is sampled outside of a blanking interval for data received at the plurality of ports.

11. The method of claim 1, wherein the set of data includes content data received at the second port.

12. The method of claim 11, further comprising storing the content data received at the second port for background processing.

13. The method of claim 11, wherein the stream of data comprises video data, and wherein the set of data received at the second port comprises video data transmitted concurrently at least in part with the stream of data.

14. The method of claim 1, further generating data decryption values for use in background processing for each of a plurality of ports.

15. The method of claim 14, further comprising storing the generated data decryption values for use in background processing as data becomes available for each of the plurality of ports.

16. The method of claim 14, wherein the data decryption values include XOR (exclusive OR) masks for HDCP (High-bandwidth Digital Content Protection) processing.

17. A receiving device comprising:
a plurality of ports for the reception of data;
a first processing engine configured to perform foreground processing of content data of a data stream, a first port of the plurality of ports being selected for foreground processing;
a sampling engine to sample data and a locking circuit to lock a clock signal for data sampling, wherein the sampling engine is configured to sample a set of data received at a second port of the plurality for ports that have not been selected for foreground processing, and the set of data includes a data packet and error correction data; and
a second processing engine configured to perform background processing of the set of data received at the second port to determine whether the set of data is encrypted, wherein the second processing engine is configured to decrypt the data packet and is configured to determine whether the decrypted data packet contains an error by analyzing the error correction data, wherein the second processing engine is also configured to determine the set of data to be encrypted responsive to determining that the data packet does not contain the error, wherein the second processing engine is also configured to determine the set of data as not being encrypted responsive to determining that the data packet contains the error.

18. The receiving device of claim 17, wherein the locking circuit operates to lock clock signals for one or more other ports of the plurality of ports that have not been selected for foreground processing, the locking circuit to poll the second port and the one or more other ports.

19. The receiving device of claim 18, wherein the locking circuit comprises a phase lock loop (PLL) circuit.

20. The receiving device of claim 17, further comprising a second locking circuit, the second locking circuit to lock a clock signal for the first port for foreground processing of data.

21. The receiving device of claim 17, further comprising a sampling engine and locking circuit for each port of the plurality of ports.

22. The receiving device of claim 17, wherein the stream of data received at the first port comprises video data.

23. The receiving device of claim 22, wherein the set of data received on the second port comprises a data island transferred during a blanking period.

24. The receiving device of claim 23, wherein the data island contains audio data, control data, or both audio data and control data.

25. The receiving device of claim 22, further comprising a data storage to store the set of data received on the second port prior to background processing by the second processing engine, the set of data received on the second port comprising video data.

26. The receiving device of claim 22, wherein the stream of data is compatible with HDMI (High-Definition Multimedia Interface).

27. The receiving device of claim 17, wherein encryption of the set of data received on the second port is compatible with HDCP (High-bandwidth Digital Content Protection).

28. A non-transitory computer-readable medium having stored thereon data representing sequences of instructions that, when executed by a processor, cause the processor to perform operations comprising:
selecting a first port of a plurality of ports for foreground processing of a stream of data received at the first port, the stream of data including content data;
sampling a set of data received at a second port of the plurality of ports, the second port being not selected for foreground processing, the set of data including a data packet and error correction data;
performing background processing of the set of data received at the second port to determine whether the set of data is encrypted, the background processing comprising decrypting the data packet and determining whether the decrypted data packet contains an error by analyzing the error correction data;
determining the set of data to be encrypted responsive to determining that the data packet does not contain the error; and
determining the set of data as not being encrypted responsive to determining that the data packet contains the error.

29. The medium of claim 28, wherein the set of data received at the second port is sampled during a blanking interval for data received at the plurality of ports.

30. The medium of claim 29, wherein the set of data comprises one or more data islands received during the blanking interval.

31. The medium of claim 29, further comprising sampling and decrypting data from each other port of the plurality of ports that has not been selected for foreground processing to determine encryption of the data received at each other port.

32. The medium of claim 31, wherein sampling and decrypting data comprises sampling and decrypting data from each of the ports that have not been selected for foreground processing during the blanking interval.

33. The medium of claim 29, further comprising instructions that, when executed by a processor, cause the processor to perform operations comprising:
  sampling data at the second port in a plurality of blanking intervals, the plurality of blanking intervals including the blanking interval and a second blanking interval.

34. The medium of claim 33, further comprising instructions that, when executed by a processor, cause the processor to perform operations comprising:
  performing background processing of data from a second set of data sampled in a second blanking interval, the second set of data including a second data packet, wherein determining whether data received at the second port is encrypted is further based on a determination whether the second data packet contains an error.

* * * * *

UNITED STATES PATENT AND TRADEMARK OFFICE
CERTIFICATE OF CORRECTION

| | | |
|---|---|---|
| PATENT NO. | : 8,793,723 B2 | Page 1 of 1 |
| APPLICATION NO. | : 12/486969 | |
| DATED | : July 29, 2014 | |
| INVENTOR(S) | : William Conrad Altmann | |

It is certified that error appears in the above-identified patent and that said Letters Patent is hereby corrected as shown below:

In the Claims

Column 12, line 45, Claim 1, after "whether," delete "of."

Signed and Sealed this
Thirty-first Day of March, 2015

Michelle K. Lee
*Director of the United States Patent and Trademark Office*